United States Patent [19]

Moody

[11] Patent Number: 5,663,121
[45] Date of Patent: Sep. 2, 1997

[54] METHOD AND APPARATUS FOR PROVIDING A STREAM OF INERT GASES IN UNDERBALANCED DRILLING OF A WELL BORE

[76] Inventor: Eugene I. Moody, 510-5th Street, S.W., Suite 1800, Calgary, Alberta, Canada, T2P 3S2

[21] Appl. No.: 362,761

[22] Filed: Dec. 22, 1994

Related U.S. Application Data

[63] Continuation-in-part of Ser. No. 173,358, Dec. 23, 1993, abandoned.

[51] Int. Cl.⁶ .................................................. C09K 7/00
[52] U.S. Cl. ........................................ 507/102; 175/71
[58] Field of Search ................................. 175/71; 507/102

[56] References Cited

U.S. PATENT DOCUMENTS

| | | |
|---|---|---|
| 3,286,774 | 11/1966 | Lorenzen et al. . |
| 3,286,778 | 11/1966 | Jackson . |
| 3,301,323 | 1/1967 | Parsons . |
| 4,136,747 | 1/1979 | Mallory et al. . |
| 4,350,505 | 9/1982 | Mallory et al. . |
| 4,670,234 | 6/1987 | Holter et al. . |
| 4,678,039 | 7/1987 | Rivas et al. ............... 166/303 |
| 4,731,233 | 3/1988 | Thompson et al. . |
| 5,312,605 | 5/1994 | Levendis et al. . |

OTHER PUBLICATIONS

Caskey "Design of a Diesel Exhaust Gas Purification System for Inert Gas Drilling" in Geothermal Resources Council, Transaction, vol. 6, Oct. 1982.

*Primary Examiner*—Philip Tucker
*Attorney, Agent, or Firm*—Young & Basile, P.C.

[57] ABSTRACT

A method and apparatus is provided for use in underbalanced drilling of a well bore. A stream of substantially inert gases is provided by cooling, treating and compressing a stream of exhaust gases. The exhaust gases are cooled to a temperature less than 100° F. in a quench tower and a heat exchanger. The cooled gases are treated to reduce their acid content and then compressed to a pressure suitable for underbalanced drilling. The compressed exhaust gases can then be used as the drilling fluids. They may or may not be mixed with atmospheric air or drilling mud.

14 Claims, 5 Drawing Sheets

METHOD AND APPARATUS FOR PROVIDING A STREAM OF INERT GASES IN UNDERBALANCED DRILLING OF A WELL BORE

This application is continuation-in-part of U. S. patent application Ser. No. 08/173,358 filed Dec. 23, 1993 now abandoned.

FIELD OF INVENTION

The present invention relates to improvements in underbalanced drilling of a well bore, and more particularly, the present invention relates to a method and apparatus for providing a stream of gases which are substantially inert, such as gases used as a primary component of drilling fluids for underbalanced drilling of a well bore.

BACKGROUND OF INVENTION

The drilling of an oil or gas well is typically carried out by use of a drill bit connected to the lower end of a drill string. The drill bit penetrates the earth to create the well bore, with the drill string continually lengthened as the drill bit cuts deeper into the earth.

Drilling fluids are required to facilitate the drilling operation. The drilling fluids are circulated through the drill string down to the drill bit and are used to control subsurface pressures and carry away cuttings and other debris from the bottom of the well bore.

The term "underbalanced drilling" or "reduced-pressure drilling" refers to drilling operations involving the circulation of a drilling fluid usually having a density less than that of water. Such drilling fluids include dry gas, mist, foam, stiff foam, aerated water, and aerated drilling mud. For example, gas drilling of oil wells, that is, drilling with the use of air or other gas as the circulating drilling fluid, is well known in the industry. Gas drilling has the advantages of increased drilling bit life and reduced drilling times. Thus, the principal benefit derived from the use of air and aerated drilling fluids is a gain in penetration rate resulting from the negative or at least reduced differential pressure between the drilling fluids and the surrounding earth.

When oxygen,containing gases, such as atmospheric air, are used as the circulation drilling fluids or are used to aerate oil-based drilling mud, there is some danger of a downhole fire and explosion. Industry experience is that downhole fires are rare incidents, however, some such downhole fires and explosions have been reported. It is believed that these have been associated with plugging of the annulus in the well bore. As such, there is a resultant increase in pressure in the system immediately prior to the explosion occurring. The adverse consequences of downhole fires are quite significant. Typically, the bottom drill bit and the drill collars and drill bits are melted away making bit recovery operations impossible. As a result, the well bore must be plugged upstream from the melt down area and sidetracked. This results in a significant loss of very expensive equipment and valuable time, thereby adding significantly to drilling costs.

Another problem encountered with underbalanced drilling using atmospheric air or aerated drilling fluids is an increase in corrosion of the drill string and drill bit. Thus, the high oxygen content in the drilling fluids enhance corrosion of the drill parts.

There have been some attempts made in the prior art to overcome these problems. For example, natural gas from a neighbouring well has been used as the drilling fluid. At present gas prices, this has become a prohibitively expensive method. In addition, the use of natural gas presents certain hazards to surface personnel.

In U.S. Pat. No. 3,301,323, a method and apparatus is disclosed for controlling the properties of the drilling fluid. In particular the oxygen and other reactive materials present in the drilling fluid is reduced and maintained at a desired low level by addition of small quantities of scavenger materials to the drilling fluid. The scavenger materials are selected to react with and neutralize either some or all of the oxygen, carbon dioxide and/or hydrogen sulfide in the drilling fluid.

U.S. Pat. No. 3,286,778 discloses a method for minimizing the occurrence of fires during well drilling with air and other gases. The method requires the addition of inert materials to atmospheric air prior to use as the drilling fluid. Inert materials that can be used include gases such as carbon dioxide, exhaust gases and nitrogen; solids such as powdered soda ash; and liquids, including suspensions or emulsions. Thus, the method of U.S. Pat. No. 3,286,774 requires the addition of inert materials to atmospheric air for use as the drilling fluids.

In U.S. Pat. Nos. 4,136,747 and 4,350,505, a method and apparatus is disclosed for reducing the oxygen content of the drilling fluids. The method disclosed includes bubbling a stream of low pressure exhaust gas through a reservoir of liquid drilling fluid. The nitrogen component of the exhaust gas displaces any dissolved oxygen in the drilling fluid. The drilling fluid is then pumped down into the well bore. The method and device disclosed by Mallory et al does not, therefore, use exhaust gas as a drilling fluid, but rather it is used only to remove or displace any oxygen from the drilling fluids.

A diesel exhaust gas purification system for inert gas drilling is described by Caskey in Geothermal Resources Council, *Transactions*, Vol. 6, October 1982. The described system, since it is for use in association with geothermal drilling, must eliminate entirely the oxygen content from the compressed exhaust gas stream. By virtue of such geothermal drilling the system must attend to $O_2/NO_x$ removal, $CO_2$ and $H_2O$ removal. The $O_2/NO_x$ removal is accomplished by use of catalytic converters commonly used in the automotive technology. Such catalytic converters are operated at extremely high temperatures to significantly decrease oxygen content to a level of less than 50 ppm and to convert $NO_x$ into nitrogen. The unit is transportable, however, the cost is extremely high, well in excess of $1,000,000. Such high costs is considered prohibitive for use in underbalanced drilling systems even though it might be a satisfactory cost for geothermal drilling.

Accordingly, it is an object of an aspect of the present invention to provide a method and apparatus for providing a stream of inert gases as a primary component of drilling fluids used in underbalanced drilling of a well bore. It has been surprisingly found that use can be made of the high volumes of substantially inert high temperature gas produced by engines used on the drilling site to drive various components of the drilling rig and the gas compressors.

SUMMARY OF THE INVENTION

According to one aspect of the present invention, a method for providing a pressurized stream of substantially inert gases as a primary component of drilling fluids used in underbalanced drilling of a well bore, comprises the steps of:
  a) treating a hot stream of exhaust gases to
    i) cool said exhaust gases;

ii) reduce acid content of said exhaust gases; and iii) increase wettability of carbon particles in said exhaust gases;

such treatment of said exhaust gases comprises cooling said exhaust gases by spraying an aqueous solution into said exhaust gases wherein acid content and wettability are treated by providing in said aqueous solution a basic agent to reduce acid content and a surfactant to increase wettability of carbon particles so as to be absorbed by said aqueous spray, b) compressing said treated stream to a pressure suitable for underbalanced drilling; and c) directing said compressed stream of gases down a drill string to provide drilling fluids during said underbalanced drilling of said well bore.

According to another aspect of the invention, an apparatus for providing a stream of inert gases as a primary component of drilling fluids used in underbalanced drilling of a well bore, comprises:

a) an inlet for introducing a hot stream of engine exhaust gases into an enlarged vessel of said apparatus;

b) means in said vessel for cooling said hot stream by introducing a spray of aqueous solution into said stream to cool said stream to a temperature suitable for compression of said stream;

c) means for treating said stream to reduce its acid content and to enhance wettability of carbon particles in said exhaust gases; and d) compressor means for compressing said cooled stream to a pressure suitable for underbalanced drilling.

BRIEF DESCRIPTION OF THE DRAWINGS

The present invention will be described with reference to the accompanying drawings in which.

DETAILED DESCRIPTION OF THE PREFERRED EMBODIMENTS

Figure 1:
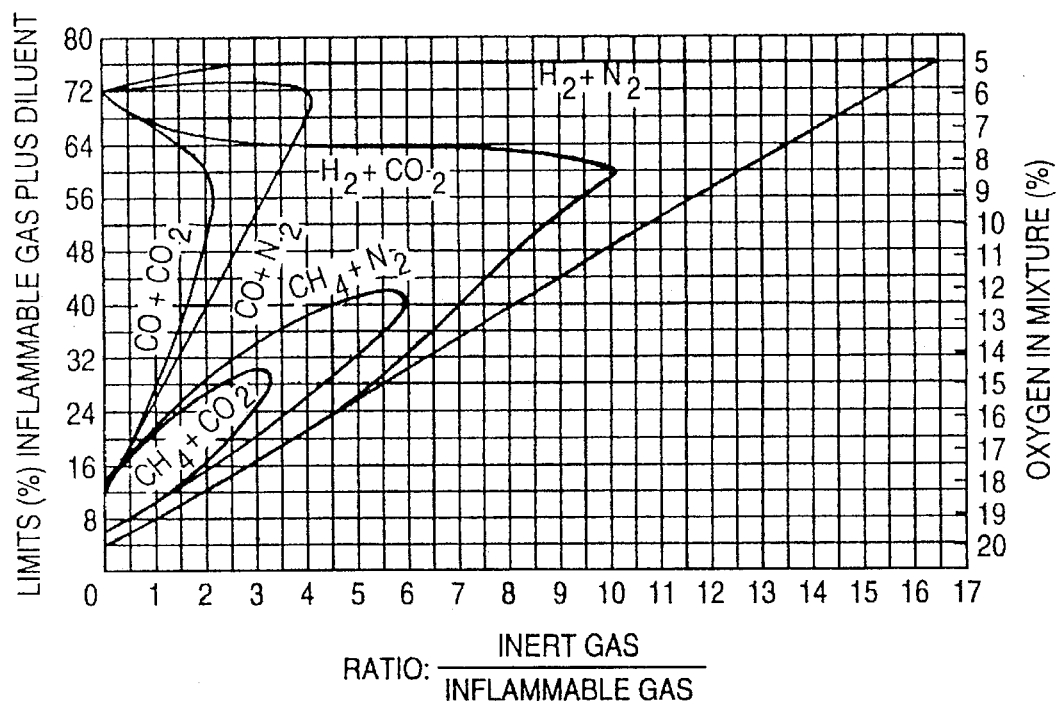
FIG. 1 is a graph showing the limits of flammability of hydrogen, carbon monoxide and methane with various amounts of carbon dioxide and nitrogen.

In order to understand the benefits and advantages of the various embodiments of the invention, the following brief discussion of downhole fire parameters is provided.

A downhole fire is not a "fire" as the term is commonly understood and used. Rather, it is a detonation or explosion. Experience has shown that downhole fires do not occur when dry gas is encountered in underbalanced drilling using a gas as a drilling fluid. Downhole explosions are normally associated with wet gas or gas and oil producing reservoirs.

The detonation or explosion of a downhole fire is spontaneous. It takes place when ignition temperature of the hydrocarbon mixture is reached.

It has been found that ignition temperature is affected by the operating conditions and, in particular, by pressure. Typically, the ignition temperature of hydrocarbons is substantially reduced (i.e. a more explosive mixture) by an increase in the operating pressure. Furthermore, the ignition temperature of hydrocarbons is reduced when the hydrocarbons are subjected to adiabatic compression, which may occur during air drilling when the annulus becomes plugged.

In order for a mixture of combustible gas or vapour with air to be explosive, the ratio of air to gas must lie within certain limits. These limits depend upon the characteristics of the hydrocarbon-air mixture present.

Table I below sets out the ignition temperature of various hydrocarbons at increasing pressure. Table II below gives the flammability limits for various hydrocarbons in air at atmospheric conditions. "Flammability Limit" is typically defined as the minimum and maximum percentages of fuel required for combustion when mixed with air.

TABLE I

Ignition Temperature in Air (°C.) - TABLE I

| Hydrocarbon | Air Pressure (atm) | | | | | |
| --- | --- | --- | --- | --- | --- | --- |
| | 1 | 5 | 10 | 15 | 20 | 25 |
| Methane | 700.00 | | | | | |
| Ethane | 575.00 | | | | | |
| Propane | 530.00 | | | | | |
| Ether | 347.22 | | | | | |
| Gas Oil | 357.78 | 304.44 | 260.00 | 232.22 | 223.89 | 212.78 |
| Crude Oil | 380.00 | | | | | |
| Kerosene | 354.44 | 298.89 | 254.44 | 221.11 | 204.44 | 196.11 |
| Gasoline | 332.22 | 310.00 | 248.89 | 215.56 | | |

TABLE II

Flammability Limits of Combustibles in Air at 1 atm and 20° C.

| COMPOUND | LOWER L | UPPER U | TL | TU |
| --- | --- | --- | --- | --- |
| Methane | 5 | 15 | | |
| Ethane | 3 | 12.4 | | |
| Propane | 2.1 | 9.5 | | |
| Butane | 1.8 | 8.4 | | |
| isoButane | 1.8 | 8.4 | | |
| Pentane | 1.4 | 7.8 | | |
| Hexane | 1.2 | 7.4 | | |
| Heptane | 1.05 | 6.7 | | |
| Octane | 0.95 | | | |
| Nonane | 0.85 | | @43° C. | |
| Decane | 0.75 | 5.6 | @53° C. | @86° C. |
| Benzene | 1.3 | 7.9 | @100° C. | @100° C. |
| Toluene | 1.2 | 7.1 | @100° C. | @100° C. |
| o-Xylene | 1.1 | 6.4 | @100° C. | @100° C. |
| Cyclopropane | 2.4 | 10.4 | | |
| Cyclohexane | 1.3 | 7.8 | | |
| Gasoline | 1.4 | 6 | | |
| Hydrogen | 4 | 75 | | |
| H2S | 4 | 44 | | |
| CO | 12.5 | 74 | | |
| NM3 | 15 | 28 | | |

When mixtures of hydrocarbons are considered, the calculation of the flammability limits in air can be carried out with reasonable accuracy using Le Chatelier's Rule. This Rule states that if the limit mixtures of any number of fuels are mixed together, the resultant mixture will also be a limit mixture.

Using a selected gas mixture, whose composition is as given in Table III below, the flammability limits can be calculated as:

lower limit of mixture=3.71%
upper limit of mixture=13.58%
An increase in pressure usually widens the limits. Experience indicates that the widening of the limits is fairly small and it may be neglected in most circumstances.

TABLE III

| Compound | Mole Fraction Air Free | Mole Fraction Air and Acid Gas Free | Liquid Volume ml/m$^3$ |
|---|---|---|---|
| $H_2$ | 0.0001 | 0.0001 | |
| He | 0.0003 | 0.0003 | |
| $N_2$ | 0.0323 | 0.0328 | |
| $CO_2$ | 0.0145 | 0.0000 | |
| $H_2S$ | 0.0000 | 0.0000 | |
| $C_1$ | 0.6138 | 0.6228 | |
| $C_2$ | 0.1697 | 0.1722 | |
| $C_3$ | 0.1013 | 0.1028 | 365.34 |
| $iC_4$ | 0.0130 | 0.0132 | 55.72 |
| $nC_4$ | 0.0340 | 0.0345 | 140.51 |
| $iC_5$ | 0.0066 | 0.0067 | 31.67 |
| $nC_5$ | 0.0075 | 0.0076 | 35.62 |
| $C_6$ | 0.0038 | 0.0039 | 20.49 |
| $C_7$ | 0.0031 | 0.0031 | 20.81 |
| Total: | 1.0000 | 1.0000 | 670.16 |

The effects of temperature can be empirically accounted for by using the following correlations available in the literature:

$$L_T/L_O = 1 - 0.000721(T-T_O)$$

and $$U_T/U_O = 1 + 0.000721(T-T_O)$$

where L and U are the lower and upper limits respectively and the T and O indicate the desired temperature and the reference (20° C.) temperature respectively.

Figure 2:
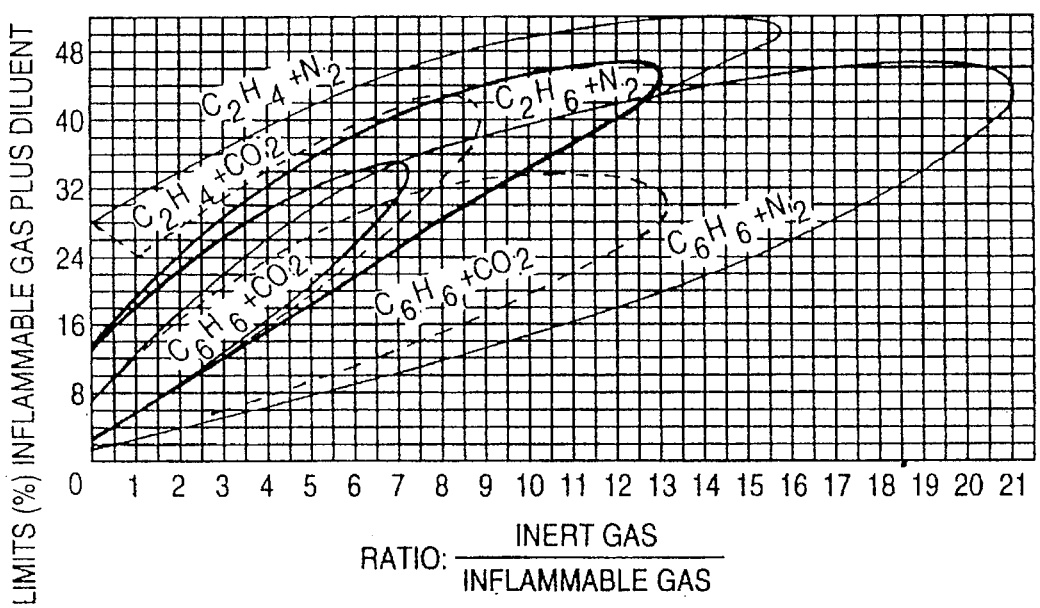
FIG. 2 is a graph showing the limits of flammability of ethane, ethylene and benzene with various amounts of carbon dioxide and nitrogen.
Figure 3:
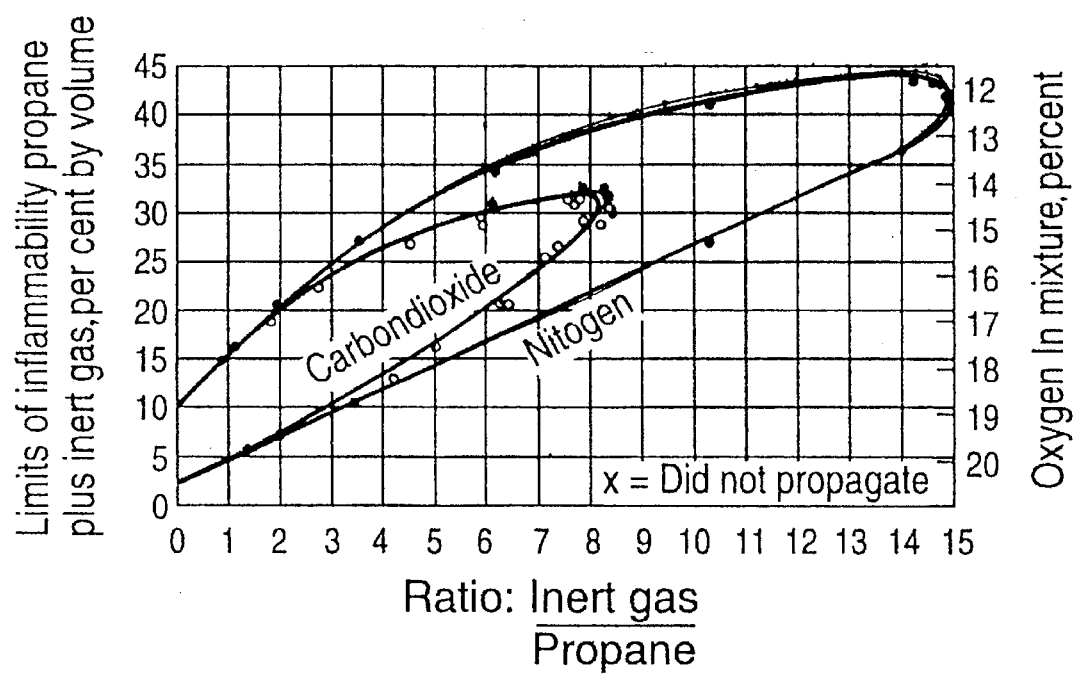
FIG. 3 is a graph showing the limits of flammability of propane and air mixtures when diluted with various proportions of nitrogen and carbon dioxide.
Figure 4:
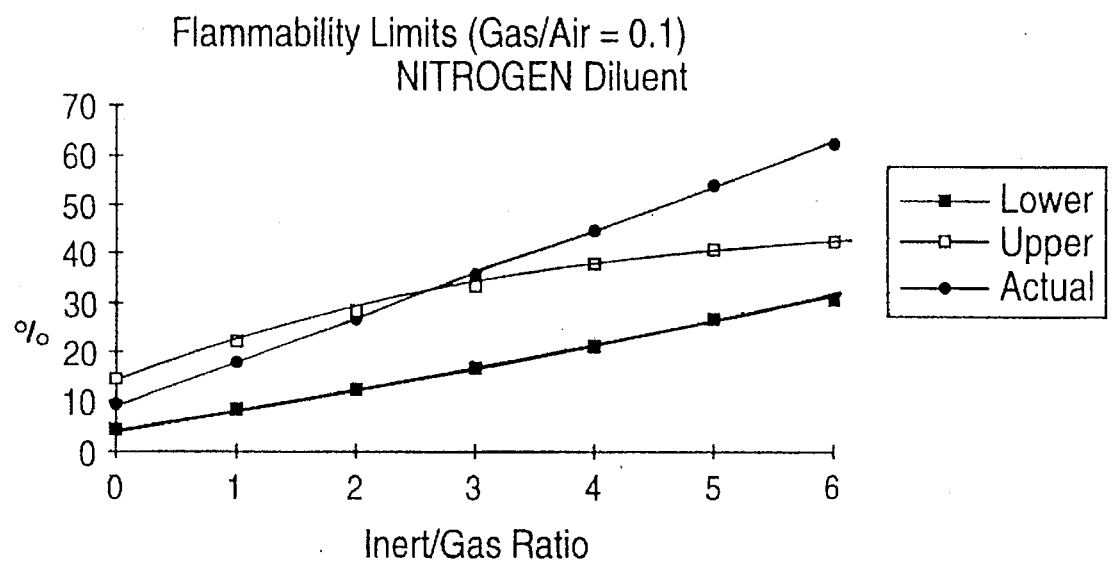
FIGS. 4 and 5 are graphs showing the limits of flammability of the mixture of Table III with various amounts of nitrogen and carbon dioxide, respectively.
Figure 5:
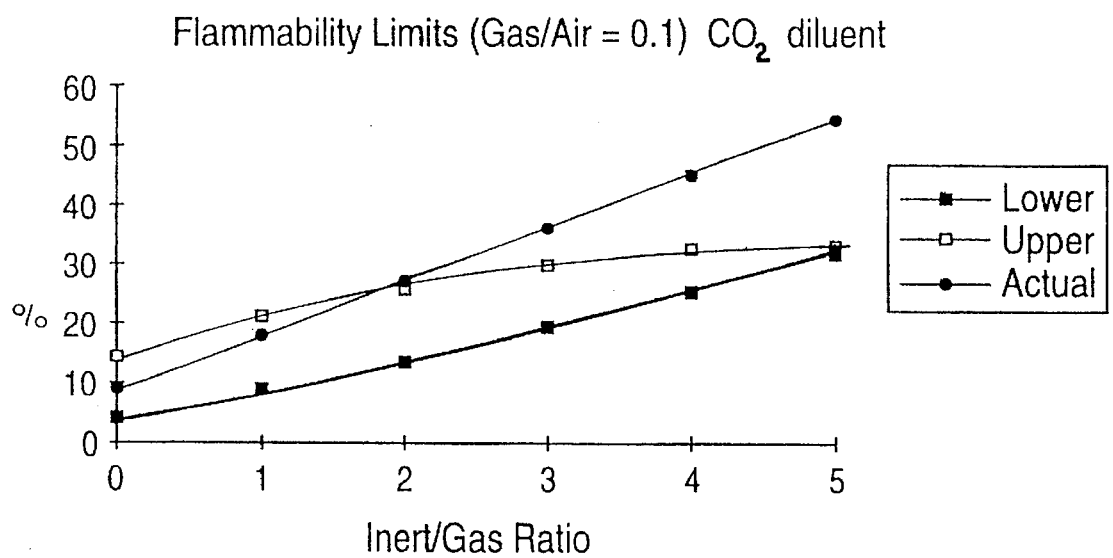

It has been found that the presence of a considerable fraction of inert gases, such as nitrogen or carbon dioxide, results in significantly different flammability limits for the mixtures. The calculation can be performed using a modified Le Chatelier's Rule with data regarding the effects of inerts on pure hydrocarbons. The results of these calculations are typically available in the literature in graphical forms as shown in FIGS. 1, 2 and 3. FIGS. 1, 2 and 3 show the data as converted to polynomial expression so that the data can be more easily integrated. The flammability limits of the mixture of hydrocarbons, whose composition is as given in Table III, when mixed with different amounts of inert nitrogen and carbon dioxide has been calculated. The results of these calculations are illustrated in graphical form in FIGS. 4 and 5 for selected operating conditions. These results indicate that dilution of the hydrocarbon mixture with inert gases reduces the flammability limits. The amount of inert gas to be added in order to render the mixture non-flammable can also be easily calculated. The results in FIGS. 4 and 5 also indicate that carbon dioxide is a more effective diluent than nitrogen.

Various sources of inert gases are available and have been used in the past. For example, natural gas has been used as the drilling gas from a nearby producible well. At present gas prices, however, this has become a relatively expensive method. Furthermore, natural gas poses certain risks to well site personnel.

Another potential source of inert gas are high pressure vessels containing nitrogen gas. However, substantial amounts of nitrogen are typically required. This may be acceptable in situations where the large vessels of nitrogen can be transported to the drill site, such as by vessel transport. However in view of the volumes required, the nitrogen can become a very expensive part of the operating costs. Furthermore, if the drill site is remote, which is normally the case, it may become impossible to transport the large vessels of high pressure nitrogen gas to the site or such transport may become prohibitively expensive. In this circumstance, drilling is usually avoided or conducted in an overbalanced fashion unless there is a significant proven reserve.

In the method and apparatus of the present invention, advantage is taken of the exhaust gases produced by diesel engines or other internal combustion engines at the well site. By virtue of this invention, it has been discovered that the exhaust gases can be treated so as to be useful as the primary or secondary component of drilling fluids. The exhaust gases are, in effect, provided as the inert gases for use as the drilling fluids in underbalanced drilling of well bores.

Unlike the system described in the aforementioned Caskey article, it is apparent from the above discussion of explosion limits that some oxygen may remain in the converted exhaust gases for use in underbalanced drilling systems. As long as the amount of oxygen in the exhaust gases is outside of the concentration range which results in an explosive mixture then nothing additional is required in the process to balance the amount of oxygen. We have found that indeed for exhaust gases from diesel engines this is the case. Exhaust gases of diesel engines comprise approximately 9 to 11% where such oxygen concentration can optionally be monitored if it is believed that oxygen levels may reach the explosive envelope as established by the data in FIGS. 1 through 3.

Accordingly, the present invention relates to the use of exhaust gases generated from diesel or gasoline powered internal combustion engines as a source of non-combustible substantially inert gas to be compressed and directed down a drill string during underbalanced drilling for hydrocarbons. The exhaust gases are used to make up 100% of the drilling fluids if drilling condition and formation compatibility dictate. Alternatively, the exhaust gases may be mixed with atmospheric air or with other drilling fluids. Such addition of atmospheric air can also be relied on to move the mixture out of the explosive envelope. The resulting drilling fluid has a major amount of substantially inert gases, thereby reducing the hazard of downhole fires.

Generally inert gases in the drilling industry are understood to be gases which are free of components which might react with the oil drilling components or might cause explosions. Hence, nitrogen is an example of an inert gas, primarily, because it is free of oxygen. However, it is suggested in accordance with this invention, that a gas can be considered substantially inert if it includes components which are normally thought to be reactive but are not reactive, because they are present at a concentration which will not cause an explosion for the reason previously described. For purposes of describing the engine exhaust gases used in accordance with this invention, the gases are understood to be substantially inert.

Figure 6:
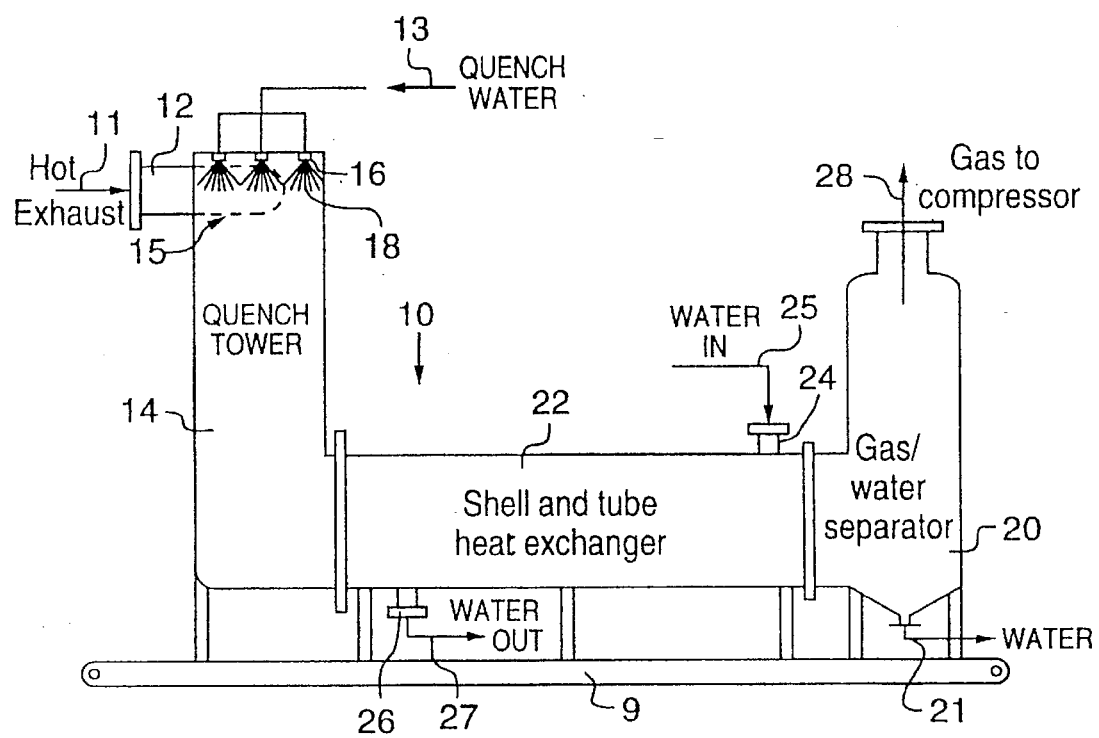
FIG. 6 is a schematic diagram showing the apparatus of the present invention.

The apparatus of the present invention, as shown in FIG. 6, is generally denoted by the numeral 10 which is mounted on a transport bed 9. It consists of a pipe 12 of compatible size coupled to the exhaust system of the internal combustion engine (not shown) to capture the spent exhaust gases. The direction of coupling pipe 12 directs the exhaust gases in the direction of arrow 11 into a spray chamber or quench tower 14. Quench tower 14 contains within its structure an array of spray nozzles 16 through which pressurized water is introduced in the direction of arrow 13 into quench tower 14 to effect a rapid cooling of the exhaust gases to a temperature suitable for compression or final cooling prior to compression. Pipe 12 is positioned on quench tower 14 so that the inlet 15 (shown in dot) directs the exhaust gases into the spray 18 of coolant water. The coolant water may originally be stored-in a reservoir (not shown) and is pumped into the quench tower 14 with a reciprocating, gear or other positive displacement pump (also not shown). The pump introduces the quench water at a flow rate which is sufficient to effect the desired rapid cooling. This can be achieved by introducing the water as a spray of a droplet size which quickly evaporates thereby removing heat from the heated gas stream. The quench tower 14 is then a representation of the many known available coolers such as spray chambers, spray heat exchange towers, spray scrubbers and the like. A consideration in the selection of the quench tower is that back pressure in the quench tower is minimal. This is a consideration from the standpoint of operation of the engine. Any significant increase in back pressure over the normal operating back pressure for the engine can significantly detract from the engine's performance and can also result in long term significant damage to the engine. Hence as shown in FIG. 6, the quench tower is of a large diameter with extended volume, such that the hot exhaust gases, as they flow from pipe 12 through opening 15, expand. Such expansion of the hot gases into the larger volume quench tower contributes to the reduction in back pressure in the pipe 12. Furthermore, back pressure in the quench tower can be reduced because the system leads to the intake side of the gas compressor which tends to reduce the overall pressure in the system.

Chemical treatment of the coolant water is designed to neutralize any carbonic acid formed as the coolant water contacts the carbon dioxide component of the exhaust gas. This may be accomplished by the coolant water being chemically treated with sodium carbonate to increase its pH, for example in the range of 10.0–11.0 to convert the sulphur dioxide component of the exhaust gases to sodium sulphite which, in turn, serves as an oxygen scavenger.

After the cooled, water-ladened exhaust gases exit the quench tower 14, they may be further cooled before proceeding into a water droplet separator, such as, a centrifugal water gas separator 20 at which point any free water suspended in the exhaust gases is removed to provide a substantially inert gas 28 which is ready to be compressed. A water outlet 21 is provided on the separator 20 for disposal or reuse of the water separated from the exhaust gases.

In a preferred embodiment of the apparatus 10 of the present invention, a shell and tube heat exchanger 22 is provided down stream from the quench tower 14 and before the water separator. The shell and tube exchanger 22 is designed to provide further cooling, as may be needed, for the exhaust gases to a temperature below 100° F. so that the exhaust gases can be suitably compressed. As is well known, the heat exchanger 22 comprises an outer shell and a plurality of inner tubes. In apparatus 10, the exhaust gases are on the tube-side whereas cooling water is on the shell side of heat exchanger 22. Heat exchanger 22 includes an inlet 24 for cooling water 25 and an outlet 26 for the cooling water 27. As the gases are further cooled, any condensate developed in the tubes falls to the bottom of the tubes. The tube bundle in the heat exchanger may be slanted so that the condensate runs off towards the separator 20. It is appreciated that there are alternatives to the tube and shell heat exchanger when additional cooling is required. For example, an air cooled heat exchanger may be used where the treated gas stream passes through tubes of a tube and fin heat exchanger. Heat is removed from the treated gas stream by air cooling of the fins on the tube exterior The dried, cooled exhaust gases exit the separator 20 via outlet 28 and enter a compressor (not shown) for compression. Depending on the type of underbalanced drilling being employed, the gases may be compressed to a pressure up to approximately 10,000 kilopascals. The stream of exhaust gases either satisfies the complete intake demand of the compressor or acts as an inert diluent for atmospheric air also being drawn into the compressor. The cooled exhaust gases form, according to the present invention, a primary component of the mixture with atmospheric air, thus the oxygen content of the mixture is sufficiently low that the likelihood of downhole fires is negated when the mixture is used as the drilling fluid. After compression, the stream of exhaust gases or exhaust gas/air mixture leaves the compressor and is directed down the drill string as per normal drilling operations involving compressed gas drilling. Alternatively, the exhaust gases or exhaust gas/air mixture may be further mixed with drilling mud or other drilling fluids to gasify the drilling mud and create a foam or an aerated fluid. The specific gravity or density of the drilling mud is thereby reduced, thus correspondingly reducing the hydrostatic pressure exerted by the drilling mud to a level suitable for use in underbalanced drilling.

In the method of the present invention, a stream of exhaust gases is cooled, treated, and compressed to a pressure of up to 10,000 kilopascals. The exhaust gases form the primary component of a gas-drilling fluid mixture, or alternatively, the primary component of a drilling mud mixture. In the latter case, the exhaust gases are used to create a foam or gassified liquid to sufficiently reduce the fluid density of the drilling fluid to a level suitable for use in underbalanced drilling.

Typically, a stream of exhaust gases exits an internal combustion engine at a temperature of approximately 950° F. This hot stream of exhaust gases must be cooled, preferably to a temperature less than 100° F., in order for the stream of exhaust gases to be compressed to the high pressures required for underbalanced drilling. In the present invention, the hot stream of exhaust gases is cooled by directing the hot stream into a spray of coolant water 18. The coolant water is provided by an array of spray nozzles 16 with the exhaust gases directed to flow through the spray 18.

The coolant fluid used in the quench tower 14 may be water, but in a preferred embodiment, the coolant fluid is an aqueous solution comprising an alkali metal, such as sodium carbonate, and a base such as an alkali or alkaline metal hydroxides which are present in an amount to provide a solution with a pH in the range of 10.0 to 11.0. A suitable dispenser may be provided to dispense into a tank for the cooling water, the necessary amounts of sodium carbonate and selected base. This aqueous solution assists not only in cooling the hot exhaust gases, but also in treating the exhaust gases so as to neutralize their acid content. In particular, any sulphur dioxide present in the stream of exhaust gases is converted to sodium sulphite by reaction with the sodium carbonate. The formed sodium sulphite in turn serves as a scavenger for any oxygen present in the stream of exhaust gases. That is, the sodium sulphite, once it is formed, readily reacts with oxygen to form sodium sulphate. Thus, the presence of sodium carbonate in the aqueous solution not only serves to reduce the amount of sulphur dioxide in the exhaust gas, but also serves, indirectly, to reduce the amount of oxygen therein.

The pH of the aqueous solution is preferably maintained between 10 and 11 so as to provide sufficient hydroxide groups to react with carbonic acid or any other acids to neutralize same. Carbonic acid may be formed as the aqueous solution contacts the carbon dioxide present in the exhaust gases. Thus, the base serves to prevent the acidification process from occurring when the carbon dioxide in the exhaust gases combines with the water phase of the aqueous solution to form carbonic acid.

In a preferred embodiment of the present invention, the hot stream of exhaust gases is cooled in a primary cooling stage by passage of the hot stream through the spray 18 of aqueous solution in the quench tower 14. The stream of exhaust gases then undergoes secondary cooling in a shell and tube heat exchanger 22. The stream of exhaust gases is, preferably, cooled to a temperature less than 100° F.

Following cooling of the stream of exhaust gases, and water remaining in the stream may be removed therefrom, for example by use of the centrifugal water gas separator 20. The stream is then directed to a compressor for compression to a pressure up to 10,000 kilopascals prior to use in underbalanced drilling. As discussed above, the compressed stream of exhaust gases may be used by itself as the drilling fluid, or it may be mixed with atmospheric air and/or drilling mud.

EXAMPLE

The composition of exhaust gases from a diesel engine running a compressor used on a drilling site was found to be as follows:

carbon dioxide: 8.8% vol.

water vapour: 9.4% vol.

oxygen: 6.0% vol.

nitrogen: 75.8% vol.

The volumetric flow rate of the exhaust gases was found to be 1425 L/s (3000 CFM) at an exhaust temperature of 925° F. The mass flow rate of the exhaust gases was thus calculated to be 0.646 kg/s.

Presuming that the exhaust gases have the same properties as nitrogen, the following amounts of water are required to cool the exhaust gases:

a) to cool from 925° F. to 80° F.: 6.7 L/s b) to cool from 925° F. to 212° F.: 0.1 L/s Thus, it was found to be preferable to cool the exhaust gases in a primary cooling stage to 212° F. using a direct quench system (that is, water spray), and to further cool in a secondary stage to 80° F. in a shell and tube heat exchanger.

In this example, the heat exchanger is a single pass system with standard 1 inch O.D. tubes, 0.810 inch I.D. (BWG 13). The design parameters of the required heat exchanger are as follows:

Shell and tube—1 pass—countercurrent 130 tubes 1" O.D.—0.810" I.D. (BWG 13)—8 ft. long arranged with triangular pitch of 1.25", provided with baffles with a pitch of 100 mm shell: 438 mm in diameter (standard) 8 ft. long.

Gas flow (tube side): 0.646 kg/s

Water flow (shell side): 7 kg/s (at 14° C.)

In accordance with an alternative embodiment of the invention, an apparatus is shown for treating an inlet stream of hot exhaust gases provide a treated cooled gas which may be delivered to a compressor station. The alternative apparatus 30 has a gas inlet 32 which may be in the form of a manifold connected to one or more internal combustion engines and perhaps up to a total of six internal combustion engines. The hot gases are delivered from the manifold 32 through check valve 34 and into delivery conduit 36. The check valve 34 provides minimal back pressure against the flow of the exhaust gases from the manifold 32 but at the same time ensures that any pressure buildup within the treatment system 30 does not permit the exhaust gases to flow back into the internal combustion engines.

For purposes of immediately cooling the hot stream of exhaust gases an aqueous spray is applied to the gas stream. Such aqueous spray at the same time provides for a treatment of the exhaust gases to reduce the acid content and to condition exhaust gases so as to enhance the wettability of entrained carbon particles. The aqueous solution to be introduced to the delivery conduit 36 may be provided through supply pipe 38 which is connected to the source of the aqueous solution to be sprayed into the conduit 36. The supply pipe 38 is connected a nozzle 40 where the aqueous solution as delivered under pressure is sprayed from nozzle 40 into the exhaust gas stream. The spray provided by the nozzle 40 is preferably a fine spray and may be sufficiently fine so as to constitute a fog, thereby increasing the surface area of the water droplets per volume of water relative the incoming gas. The finer the water droplets the greater the speed with which the excess gases are cooled. Furthermore, the fine water spray in carrying additives to reduce acid content and increase wettability of the carbon particles have a greater chance of contacting the incoming exhaust gas stream to treat these entities. As described with respect to the apparatus 10 of FIG. 6, the apparatus of FIG. 7 may use the same components with respect reducing acid content. However, in accordance with this embodiment, the aqueous solution to be sprayed through nozzle 40 may also include a surfactant, the purpose of which is to enhance wettability of the carbon particles. As is appreciated by those skilled in the art, a variety of surfactants may be used to increase the wettability of the carbon particles but at the same time not effect the operation of the remainder of the treatment apparatus nor of the compressors. Particularly preferred surfactants for use in this manner are generally described as fluorochemical surfactants. The preferred fluorochemical surfactants are sold under the trademark FLUORAD and are readily available from Alchom and Hoffman of Calgary, Canada. The fluorochemical surfactants have both a hydrophobic and an oleophobic tail. The oleophobic tale comprises a stable fluorocarbon with a solubilizing group at the head of the surfactant structure. It is the unique fluorocarbon tail modified in length and structure which meets the end use for enhancing wettability of carbon particles in a gas stream. The fluorocarbon tail of the surfactant is resistant to degradation by heat or by strong oxidizing reducing agents, hence, making the surfactant particularly suitable for introduction to and treatment of the hot exhaust gases from the diesel engines.

The check valve 34 may also be equipped with a bypass valve to divert the exhaust gases to atmosphere when it is not desired to pass the exhaust gases through the treatment system 30. This diverter valve may be employed in situations where there is an overload on the compressor system, perhaps a breakdown of the compressor system or there simply is not a need for treated gases for use in the drilling operation.

After the exhaust gases encounter the fine spray introduced at nozzle 40 they travel along the continuation of the conduit 42 which may be a pipe of approximately 10 inches in diameter. As the gases travel along this pipe the temperature of the gas is reduced by way of the sprayed aqueous solution cooling the gases. The gases may enter at a temperature in the range of 750° to 900° F. By the time the gases reach the end manifold 44 they may have dropped in temperature to 150° F. During the passage along conduit 42, the carbon particles which have been wetted by the surfactant are more apt to become absorbed by the water droplets and hence be removed from the gases before entry into an open tube bundle, heat exchanger 46. The open tube bundle is cooled by two high volume electrically powered fans preferably capable of delivering 15,000 cubic feet of air per minute into and up through the tubing bundle 46. The fans are designated respectively 48 and 50 where the air that passes over the fan blades 52 and 54 is delivered upwardly through the open tube bundle in the direction of arrows 56 and 58. The air flows in a tortuous path upwards and over the tube bundles and is forced upwardly from above the tube bundle and is vented to atmosphere. In the event that air cooling of the tube bundle is not sufficient to reduce the temperature of the treated gas stream to the desired level, a water spray assembly, generally designated 60 is provided. The exit collection header 62 may be provided with one or more temperature sensors (not shown) which determine whether the blowers 48 and 50 on their own or the blowers 48 and 50 in combination with the water spray assembly 60 are used to cool the gases exiting in the direction of arrows 64 into the exit collection header to the desired reduced temperature.

Preferably, the gases as they leave the exit collection header 62 are at a temperature in the range of approximately 45° F. In the process of cooling through the open tube bundle, it is understood that the moisture within the gases condense. The moisture is primarily from the quench water introduced through nozzle 40. Although there may be the usual moisture in the exhaust gases from combustion in the internal combustion engines, the tubes within the open tube bundle are sloped such that water, which condenses and falls out onto the tubes, runs toward the exit collection header 62 and downwardly onto a funnel 66 for discharge through drain outlet 68. It should also be noted that when the water spray assembly is actuated to release water onto the open tube bundle to provide further cooling for the gases travelling through the tube system, such water spray, as it flows downwardly over the tubes is collected in a drip pan 70 which has an outlet at 72. The outlet 72 is in communication with conduit 74 which directs that water as well into the drain 66 and out through drain outlet 68.

In most situations the open tube bundle system will be sufficient to cool and dry the air to a level such that it is ready to be compressed for use in a drilling facility. However, where it is desired to even cool the gas further and also provide for additional removal of moisture from the gas, the gases may be run from the collection header 62 to the entrance side 76 of a shell and tube heat exchanger. The gases flow in the direction of arrow 78 through the shell and tube heat exchanger and exit from the heat exchange in the direction of arrows 80. Coolant to cool the shell and tube exchanger is provided. The coolant enters the heat exchanger through coolant inlet 82 and is removed from the heat exchanger through coolant outlet 84. Although the shell and tube exchanger is shown schematically it is appreciated that any of the well known type of shell and tube heat exchangers may be used for the purposes described in further reducing the temperature of gas and also removing moisture therefrom. Preferably, when the shell and tube heat exchanger 86 is used in the system, it further cools the gases to approximately 35° F. The tubes in the heat exchanger are sloped towards the outlet end 88 of the heat exchanger where the moisture falls onto drain floor 90 and flows into drain 92. The drain water is then dispensed with through drain outlet 94.

The use of various types of surfactants and in accordance with a preferred aspect of the invention, the use of fluorochemical surfactants greatly enhance the removal of carbon particulates from the engine exhaust gas stream. The surfactant serves to enhance the wettability of the carbon particles so that they are captured by the quench water and as well captured by the water vapour which condenses from the gases as they flow through the open tube bundle 46 and the heat exchanger 86.

It is unlikely that the gases require any further treating. However, as a precautionary measure an oil bath filter 96 is provided to complete the final removal of carbon particulars from the exhaust gases. The oil bath filter is constructed in the usual manner. An oil bath 98 is provided in tray 100. The treated exhaust gases flow in the direction of arrow 102 through the oil and then upwardly through the remaining filter portion 104 of the filter system. The finished exhaust gases are then released from the oil filter through the exhaust gas exit 106. Exhaust gas exit 106 is connected to a suitable compressor array for increasing pressure of the exhaust gases to the desired pressure for purposes of oil or mineral drilling. Preferably and in the usual manner, the exhaust gas line 106 is equipped with a controlled manifold valve which allows the gas to be fed into the suction side of compressor or be vented to atmosphere in the event it is not required by the compressors. By running the exhaust gases from the engine through this system, the primary purpose of preparing the gases for compression is achieved but it is also understood that in situations where the gases are to be vented, they are in better condition for such venting to atmosphere.

Figure 7:
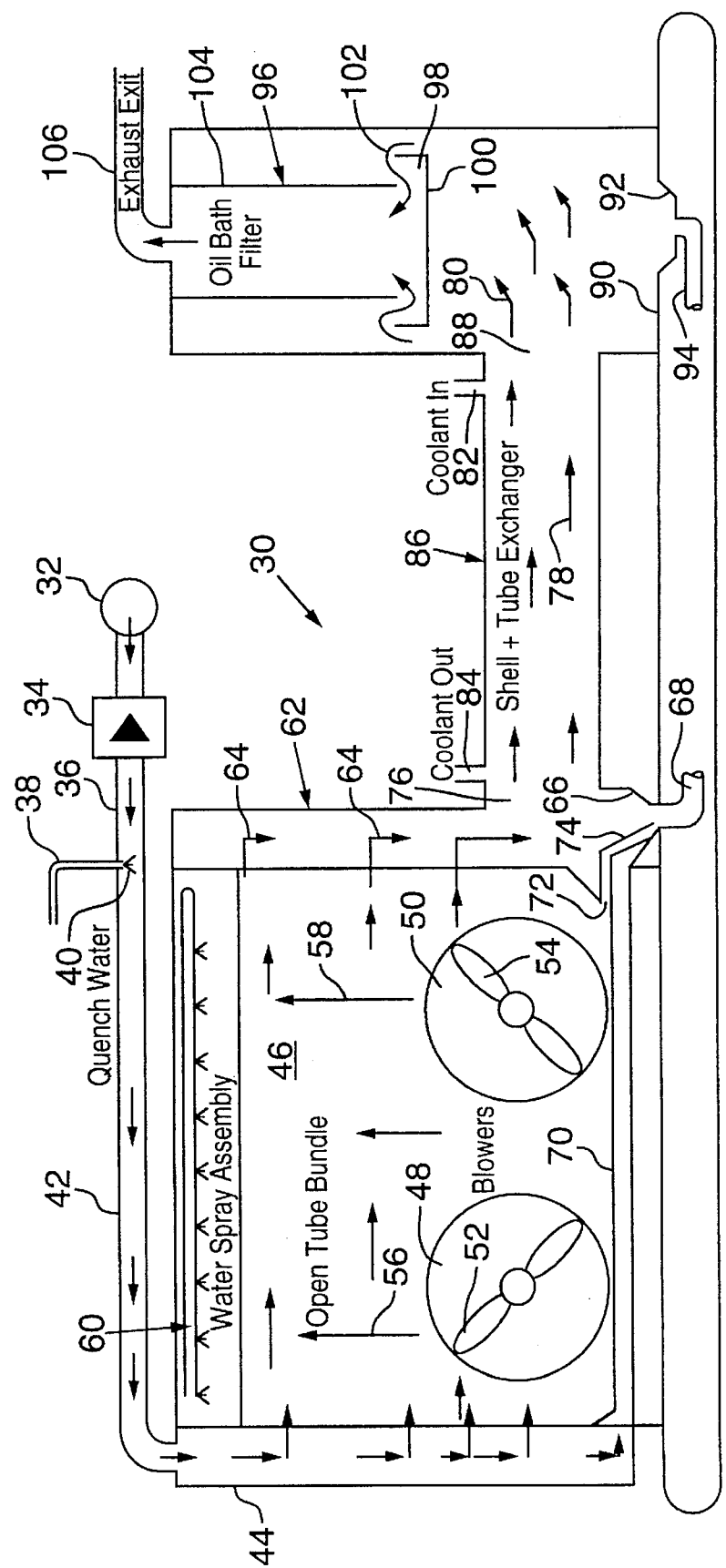
FIG. 7 is a schematic diagram showing an alternative embodiment for the apparatus of this invention.

The alternative preferred embodiment of the invention, as described with respect to FIG. 7 is, as with the system of FIG. 6, a portable unit which may be mounted on a skid. The ski may measure approximately 30 feet in length, 8 feet in width and approximately 12 feet in height.

Alterations and modifications are possible within the scope of the invention. For example, two or more systems designated 10 or 30 in the drawings may be used in parallel so as to increase the capacity of the system as a whole. As well, the sprayed aqueous solution may comprise other additives to neutralize and/or react with other components of the exhaust flue gases. All such alterations and modifications are believed to be within the scope of the claims appended hereto.

In respect of alternations or modifications to the invention, it is also appreciated that the substantially inert gases, as provided by the apparatus and process of this invention, may be useful in other areas of commerce which require the use of inert gases. Such areas of commerce may or may not be in the gas and oil business. For example, the substantially inert gases provided by the process and apparatus of this invention may be used to replace natural gas as a source of gas lift used in areas where compression is present. The inert gas could be used in a method for reducing the weight of fluid columns through the use of gas lift mandrels and valves. Such inert gases can render wells economically more favourable and thereby increase the overall level of oil production while maintaining profitability. Furthermore, the inert gases may be used as a source for offshore gas lift operations when no other source is available within reasonable costs. Furthermore, inert gases provide all of the advantages of a gas lift without the downside aspect of unfavourable natural gas conservation practices, especially as they are practiced offshore. Furthermore, the inert gases may be used as an alternative to swabbing or other conventional methods of starting up a well. Hence the inert gases may be very useful in testing of a well prior to production start-up. The inert gases may be used to commence flow of the petroleum products. In commencing such flow with inert gases, this may be done without swabbing on either new wells or on existing wells during work-over application using service rig engines as a source of exhaust gases to provide the inert gases. Other uses include energizing hydraulic fracturing fluids to improve stimulation of the well; conducting underbalanced perforation by use of the inert gases; aeration of various types of drilling fluid using inert gases; the deployment of parasite strings with oil-based drilling fluids in the presence of the inert gases; overbalance locking mandrels and prongs prior to pulling by use of the inert gases. The inert gases may also be used as a well control fluid during completion or production. As well the inert gases may be used for pressure testing in remote locations, such as offshore drilling situations; for example, the pressurized inert gases could be used to pretest blow-out preventer stacks prior to installation on a well. The inert gas may also be used in coiled tubing operations, such as in underbalanced drilling operations using large diameter coiled tubing. The inert gases may also be used as an alternate to nitrogen as the primary source of gasification of cement slurries, particularly in remote locations. There are therefore several uses of the substantially inert gases as provided by this invention which may or may not be related to the underbalanced drilling process.

Although preferred embodiments of the invention are described herein in detail, it will be understood by those skilled in the art that variations may be made thereto without departing from the spirit of the invention or the scope of the appended claims.

I claim:

1. A method for providing a pressurized stream of substantially inert gases as a primary component of drilling fluids used in underbalanced drilling of a well bore, comprising the steps of:

a) treating a hot stream of exhaust gases from an internal combustion engine to
      i) cool said exhaust gases;
      ii) reduce acid content of said exhaust gases; and
      iii) increase wettability of carbon particles in said exhaust gases;

such treatment of said exhaust gases comprising collecting hot exhaust gases from said internal combustion engine to form said hot stream of exhaust gases, directing said hot stream of exhaust gases to said treatment step wherein said hot stream is cooled by spraying an aqueous solution into said exhaust gases wherein acid content and wettability are treated by providing in said aqueous solution a basic agent to reduce acid content and a surfactant to increase wettability of carbon particles so as to be absorbed by said aqueous spray, b) separating by condensing said aqueous solution from said cooled stream to remove in said aqueous solution said wetted carbon particles and neutralized acid content, c) compressing said treated stream to a pressure suitable for underbalanced drilling; and d) directing said compressed stream of gases down a drill string to provide drilling fluids during said underbalanced drilling of said well bore.

2. The method of claim 1, wherein said compressed stream of exhaust gases makes up all of said drilling fluids.

3. The method of claim 1, further comprising the step of mixing said compressed stream of exhaust gases with a minor amount of drilling fluids prior to directing said mixture down said drill string.

4. The method of claim 3, wherein said minor amount of drilling fluids is atmospheric air compressed to a pressure suitable for underbalanced drilling.

5. The method of claim 3, wherein said minor amount of drilling fluids is drilling mud and said mixture of said compressed stream of exhaust gases and said drilling mud has a fluid density suitable for underbalanced drilling.

6. The method of claim 1, wherein said treating of said stream of exhaust gases is done by subjecting said stream to an aqueous solution comprising sodium carbonate and alkali or alkaline metal hydroxides.

7. The method of claim 6, wherein said stream of exhaust gases include sulphur dioxide, said sulphur dioxide being substantially all converted to sodium sulphite by reacting with said sodium carbonate.

8. The method of claim 7, wherein said exhaust gases include oxygen remaining from internal engine combustion, any remaining oxygen present in said drilling fluids being substantially all converted to sodium sulphate by reaction with said sodium sulphite.

9. The method of claim 6, wherein said exhaust gases include carbonic acid where any carbonic acid is substantially all neutralized by said metal hydroxide.

10. The method of claim 1 wherein said surfactant is selected from the group of fluorochemical surfactants.

11. The method of claim 1, wherein said hot stream of exhaust gases is further cooled in a shell and tube heat exchanger using a cooling liquid or by an air cooled heat exchanger.

12. The method of claim 10 or 11, wherein said hot stream of exhaust gases is cooled to a temperature less than about 100° F.

13. The method of claim 10, wherein said aqueous solution comprises sodium carbonate and a base for said treating of said stream of exhaust gases.

14. The method of claim 1, wherein said treated stream of exhaust gases is compressed to a pressure of up to 10,000 kilopascals.

* * * * *